US012650807B2

(12) United States Patent
Law et al.

(10) Patent No.: US 12,650,807 B2
(45) Date of Patent: Jun. 9, 2026

(54) SMART GLASSES, METHOD AND DEVICE FOR AUTOMATIC VOLUME CONTROL, AND SMART GLASSES SYSTEM

(71) Applicant: SOLOS TECHNOLOGY (SHENZHEN) LIMITED, Shenzhen (CN)

(72) Inventors: Kwok Wah Law, Shenzhen (CN); Chiu Ming So, Shenzhen (CN); Chi Sum Yu, Shenzhen (CN); Wai Kuen Cheung, Shenzhen (CN)

(73) Assignee: SOLOS TECHNOLOGY (SHENZHEN) LIMITED, Shenzhen (CN)

( * ) Notice: Subject to any disclaimer, the term of this patent is extended or adjusted under 35 U.S.C. 154(b) by 156 days.

(21) Appl. No.: 18/582,908

(22) Filed: Feb. 21, 2024

(65) Prior Publication Data

US 2024/0192916 A1 Jun. 13, 2024

Related U.S. Application Data

(63) Continuation of application No. PCT/CN2022/114667, filed on Aug. 25, 2022.

(30) Foreign Application Priority Data

Aug. 26, 2021 (CN) .......................... 202110988988.7

(51) Int. Cl.
G06F 3/16 (2006.01)
G02C 11/00 (2006.01)
G11B 20/10 (2006.01)

(52) U.S. Cl.
CPC .............. *G06F 3/165* (2013.01); *G02C 11/10* (2013.01); *G11B 20/10527* (2013.01); *G11B 2020/10574* (2013.01)

(58) Field of Classification Search
CPC ... G06F 3/165; G02C 11/10; G11B 20/10527; G11B 2020/10574
See application file for complete search history.

(56) References Cited

U.S. PATENT DOCUMENTS 10,904,669 B1 1/2021 Talakoub et al.
2009/0323987 A1* 12/2009 Yang ........................ H03G 1/02
381/109
2017/0366891 A1 12/2017 Yang

FOREIGN PATENT DOCUMENTS

CN 102783186 A 11/2012
CN 114664320 A 6/2022

OTHER PUBLICATIONS

International Search Report of PCT Patent Application No. PCT/CN2022/114667 issued on Nov. 28, 2022.

* cited by examiner

*Primary Examiner* — Joseph Saunders, Jr.

(57) ABSTRACT

Smart glasses, method and device for automatic volume control, and smart glasses system are provided. The smart glasses include: a glasses body, and a wireless communication module, microphone(s) and speaker(s) provided on the glasses body. The wireless communication module has a processor connected to the microphone(s) and the speaker(s). The microphone(s) transmit a picked up audio signal to the processor. The processor determines whether the audio signal is a noise signal, calculates a noise level of the noise signal when the audio signal is the noise signal, and adjusts an output volume of the speaker(s) to an output volume corresponding to the noise level of the noise signal according to a preset corresponding relationship between noise levels and output volumes of the speaker(s). The present application can automatically adjust the output volume according to the noise level, and improve the intelligence of smart glasses and convenience of user action.

15 Claims, 7 Drawing Sheets

Smart Glasses — 100

— 200

Smart Terminal

Cloud System — 300 or

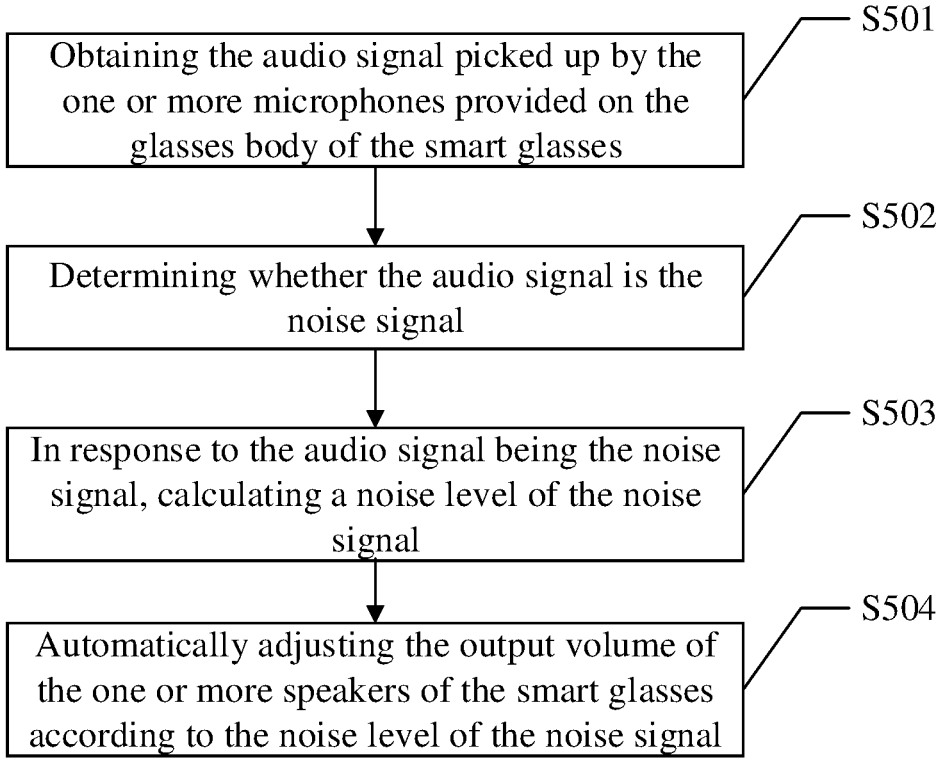

S501

Obtaining the audio signal picked up by the one or more microphones provided on the glasses body of the smart glasses

S502

Determining whether the audio signal is the noise signal

S503

In response to the audio signal being the noise signal, calculating a noise level of the noise signal

S504

Automatically adjusting the output volume of the one or more speakers of the smart glasses according to the noise level of the noise signal

FIG. 5

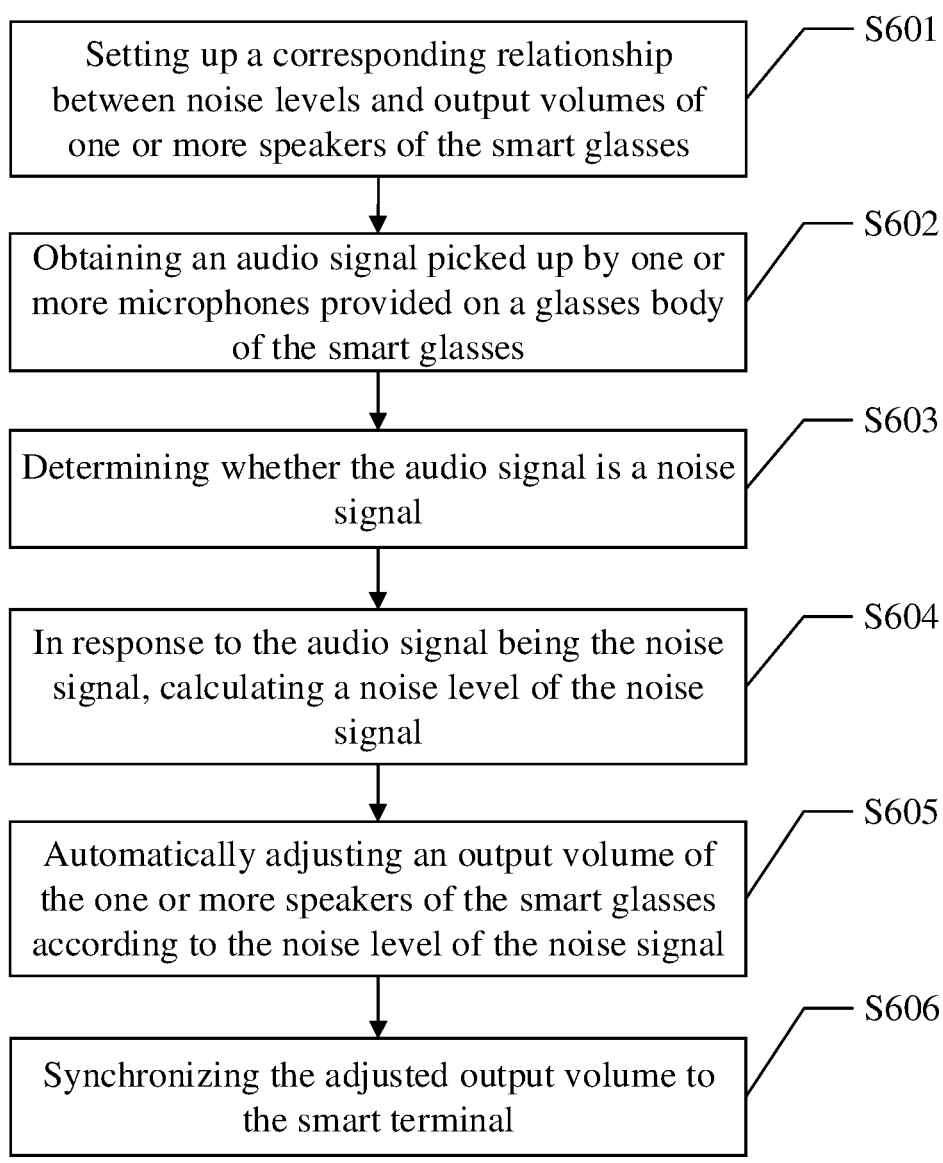

Setting up a corresponding relationship between noise levels and output volumes of one or more speakers of the smart glasses — S601

Obtaining an audio signal picked up by one or more microphones provided on a glasses body of the smart glasses — S602

Determining whether the audio signal is a noise signal — S603

In response to the audio signal being the noise signal, calculating a noise level of the noise signal — S604

Automatically adjusting an output volume of the one or more speakers of the smart glasses according to the noise level of the noise signal — S605

Synchronizing the adjusted output volume to the smart terminal — S606

FIG. 6

SMART GLASSES, METHOD AND DEVICE FOR AUTOMATIC VOLUME CONTROL, AND SMART GLASSES SYSTEM

CROSS REFERENCE TO RELATED APPLICATIONS

The present application is a Continuation Application of PCT Application No. PCT/CN2022/114667, filed on Aug. 25, 2022, which claims the priority of Chinese Patent Application No. 202110988988.7, titled "SMART GLASSES, METHOD AND DEVICE FOR AUTOMATIC VOLUME CONTROL, AND SMART GLASSES SYS-TEM", filed on Aug. 26, 2021, the entire contents of which are hereby incorporated by reference.

BACKGROUND

1. Technical Field

The present disclosure generally relates to the technical field of smart wearable device, and in particular to smart glasses, a method and device for automatic volume control, and a smart glasses system.

2. Description of Related Art

A smart glasses system generally provides basic functions through a glasses body, such as listening to music, answering and making phone calls, etc. In addition to the above basic functions, the smart glasses system further uses sensors of the glasses body and the smart terminal to detect movements of a human head to provide voice prompts. The mediums for the communication between the smart glasses and the user include the microphone and the speaker, the microphone is mainly used to receive user voice information, and the speaker is mainly used to output the music or voice information to the user's ear.

The user uses the smart glasses in different environments, and the ambient noise varies in different environments. In the prior art, the user needs to manually adjust the output volume of the smart glasses, that is, the user turns up the output volume when the ambient noise is high, and the user turns down the output volume when the ambient noise is low. Manually adjusting the output volume is not intelligent enough, and brings inconvenience to the user action.

SUMMARY

The present disclosure provides a smart glasses, method and device for automatic volume control, and smart glasses system, which aim to solve the problems that the smart glasses cannot automatically adjust the output volume of the speaker according to the noise volume, and bring the inconvenience to the user action.

An embodiment of the present disclosure provides smart glasses, including: a glasses body, a wireless communication module, one or more microphones and one or more speakers, wherein the wireless communication module, the one or more microphones and the one or more speakers are provided on the glasses body;

a processor is built into the wireless communication module, and the processor is connected to the one or more microphones and the one or more speakers;

the one or more microphones are configured to pick up an audio signal and transmit the audio signal to the processor; and the processor is configured to: determine whether the audio signal is a noise signal, and in response to the audio signal being the noise signal, calculate a noise level of the noise signal, and adjust an output volume of the one or more speakers to an output volume corresponding to the noise level of the noise signal according to a preset corresponding relationship between noise levels and output volumes of the one or more speakers.

An embodiment of the present disclosure provides a method for automatic volume control, applied to the above-mentioned smart glasses, including:

obtaining the audio signal picked up by the one or more microphones provided on the glasses body of the smart glasses;

determining whether the audio signal is the noise signal;

in response to the audio signal being the noise signal, calculating the noise level of the noise signal; and adjusting the output volume of the one or more speakers provided on the glasses body of the smart glasses to an output volume corresponding to the noise level of the noise signal according to the preset corresponding relationship between noise levels and output volumes of the one or more speakers.

An embodiment of the present disclosure provides a device for automatic volume control, including: a processor; a non-transitory computer readable storage medium coupled to the processor; and one or more computer programs stored on the non-transitory computer readable storage medium and executable on the processor;

wherein, the one or more computer programs comprise:

instructions for obtaining an audio signal picked up by one or more microphones provided on a glasses body of smart glasses;

instructions for determining whether the audio signal is a noise signal;

instructions for, in response to the audio signal being the noise signal, calculating a noise level of the noise signal; and instructions for adjusting an output volume of one or more speakers provided on the glasses body of the smart glasses to an output volume corresponding to the noise level of the noise signal according to a preset corresponding relationship between noise levels and output volumes of the one or more speakers.

An embodiment of the present disclosure provides a smart glasses system, including:

smart glasses, a smart terminal and a cloud system;

wherein the smart glasses are connected to the smart terminal through a wireless network, and the smart terminal is connected to the cloud system through a wireless network;

the smart glasses are configured for: obtaining, through one or more microphones provided on a glasses body of the smart glasses, an audio signal; determining whether the audio signal is a noise signal; and in response to the audio signal being the noise signal, calculating a noise level of the noise signal, and adjusting an output volume of one or more speakers provided on the glasses body of the smart glasses to an output volume corresponding to the noise level of the noise signal according to a preset corresponding relationship between noise levels and output volumes of the one or more speakers;

the smart glasses are further configured for sending the adjusted output volume to the smart terminal; and the smart terminal is configured for synchronously updating an output volume of a speaker of the smart terminal to the adjusted output volume.

In each of the embodiments of the present disclosure, the smart glasses include the glasses body, and the wireless communication module, microphone(s) and speaker(s) provided on the glasses body, the wireless communication module has the built-in processor, the processor is connected to the microphone(s) and the speaker(s), the processor obtains the audio signal picked up by the microphone(s) and determines whether the audio signal is the noise signal, and when the audio signal is the noise signal, the processor calculates the noise level of the noise signal and adjusts the output volume of the speaker(s) to the output volume corresponding to the noise level of the noise signal, according to the preset corresponding relationship between noise levels and output volumes of the speaker(s), thereby realizing automatic adjusting and controlling the output volume of the speaker(s) according to the noise volume, and improving the intelligence of the smart glasses, moreover, the audio volume heard by the user under different noise volumes can auditory consistent, so as to improve the auditory experience.

BRIEF DESCRIPTION OF THE DRAWINGS

In order to more clearly illustrate the technical solutions in this embodiment, the drawings used in the embodiments or the description of the prior art will be briefly introduced below. It should be understood that, the drawings in the following description are only examples of the present disclosure. For those skilled in the art, other drawings can be obtained based on these drawings without creative works.

FIG. 5 is a flow diagram of a method for automatic volume control according to one embodiment of the present disclosure;

FIG. 6 is a flow diagram of the method for automatic volume control according to another embodiment of the present disclosure;

DETAILED DESCRIPTION

Figure 1:
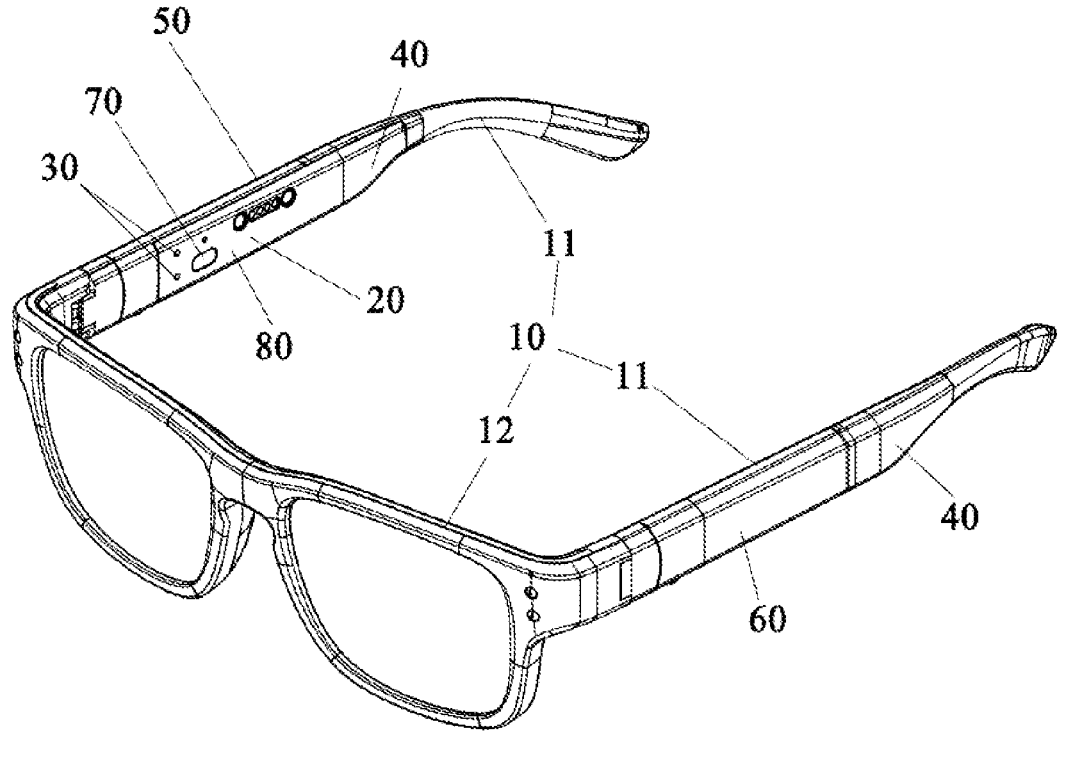
FIG. 1 is a schematic diagram of a hardware structure of smart glasses according to one embodiment of the present disclosure.

In order to make the objects, features and advantages of the present disclosure more obvious and easier to understand, the technical solutions in this embodiment will be clearly and completely described below with reference to the drawings. Apparently, the described embodiments are part of the embodiments of the present disclosure, not all of the embodiments. All other embodiments obtained by those skilled in the art based on the embodiments of the present disclosure without creative efforts are within the scope of the present disclosure.

In the following descriptions, the terms "including", "comprising", "having" and their cognates that are used in the embodiments of the present disclosure are only intended to represent specific features, numbers, steps, operations, elements, components, or combinations of the foregoing items, and should not be understood as excluding the possibilities of the existence of one or more other features, numbers, steps, operations, elements, components or combinations of the foregoing items or adding one or more features, numbers, steps, operations, elements, components or combinations of the foregoing items.

In addition, in the present disclosure, the terms "first", "second", "third", and the like are only used for distinguishing, and cannot be understood as indicating or implying relative importance.

Unless otherwise defined, all terms (including technical and scientific terms) used herein have the same meanings as commonly understood by those skilled in the art to which the embodiments of the present disclosure belong. The terms (e.g., the terms those defined in commonly used dictionaries) will be interpreted as having the same meaning as the contextual meaning in the relevant technology and will not be interpreted as having idealized or overly formal meanings, unless clearly defined in the embodiments of the present disclosure.

An embodiment of the present disclosure provides smart glasses, the smart glasses can automatically adjust the output volume according to the noise in a music playback mode or a telephone voice call mode, so that the voice volume in auditory does not change due to changes in ambient noise when the user is listening to the music or the voice call, and the auditory sensation is more comfortable.

Specifically, a wireless communication module, microphone(s) and speaker(s) are provided on a glasses body of the smart glasses. A processor is built into the wireless communication module, and the processor is connected to the microphone(s) and the speaker(s). The microphone(s) are used to: obtain an audio signal, and continuously transmit the audio signal to the processor. The processor recognizes whether the audio signal is a noise signal, and when the audio signal is the noise signal, calculates a noise level (i.e., noise value), and adjusts an output volume of the speaker(s) to an output volume corresponding to a current noise level of the noise signal, according to a preset corresponding relationship between noise levels and output volumes of the speaker(s). In the preset corresponding relationship, if the noise level is high, the output volume will be high, and if the noise level is low, the output volume will be low. Therefore, when the current noise level is high, the output volume of the speaker is increased, and when the current noise level is low, the output volume of the speaker is decreased, so that the smart glasses can automatically adjust the output volume according to surrounding ambient noise.

Referring to FIG. 1, a schematic diagram of a hardware structure of smart glasses according to one embodiment of the present disclosure. For ease of description, only parts related to the embodiment of the present disclosure are shown in the FIG. 1. As shown in FIG. 1, the smart glasses include: a glasses body 10, a wireless communication module 20, one or more microphones 30 and one or more speakers 40.

The glasses body includes one or more temples 11 and a front frame 12. The wireless communication module 20 is provided at the inner side of the one or more temples 11 of the glasses body 10, and is connected to the one or more microphones 30 and the one or more speakers 40. A processor is built into the wireless communication module 20, and the processor mainly includes a MCU (Micro Control Unit) (i.e., microcontroller) and a DSP (Digital Signal Processing, or Digital Signal Processor) connected to the MCU. Specifically, the MCU is connected to the one or more microphones 30 and the one or more speakers 40, and is used to adjust the output volume of the one or more speakers 40 according to the noise signal picked up by the one or more microphones 30. The DSP is used to process the data sent by the MCU and return the processed data to the MCU.

The wireless communication module 20 is further provided with a communication sub-module (such as, one or more signal transceivers and peripheral circuits thereof) for communicating and interacting with other devices and modules in the smart glasses, or communicating and interacting with smart terminal(s) other than the smart glasses, and the cloud system, through wireless communication manners such as WIFI or Bluetooth.

The one or more microphones 30 are used to pick up an audio signal, and the audio signal may be the voice spoken by the user, or may be the noise from the ambient environment. The one or more microphones 30 transmit the picked up audio signal to the processor. The processor is used to: determine whether the audio signal is the noise signal; and in response to the audio signal being the noise signal, calculate a noise level of the noise signal, and adjust the output volume of the one or more speakers 40 to an output volume corresponding to a current noise level of the noise signal according to a preset corresponding relationship between noise levels and output volumes of the one or more speaker 40.

The corresponding relationship between noise levels and output volumes of the one or more speakers 40 is stored on the processor in advance, and can be customized by the user. The higher the noise level, the higher the output volume, and the noise level and the output volume are positively correlated. Accordingly, the audio volume heard by the user under different noise volumes can auditory consistent.

In the embodiments of the present disclosure, the smart glasses include the glasses body, and the wireless communication module, microphone(s) and speaker(s) provided on the glasses body, the processor is built in the wireless communication module, the processor is connected to the microphone(s) and the speaker(s), the processor obtains the audio signal picked up by the microphone(s) and determines whether the audio signal is the noise signal, and when the audio signal is the noise signal, the processor calculates the noise level of the noise signal and adjusts the output volume of the speaker(s) to the output volume corresponding to the noise level of the noise signal, according to the preset corresponding relationship between noise levels and output volumes of the speaker(s), thereby realizing automatic adjusting and controlling the output volume of the speaker(s) according to the noise volume, and improving the intelligence of the smart glasses, moreover, the audio volume heard by the user under different noise volumes can auditory consistent, so as to improve the auditory experience.

Furthermore, in another embodiment, the number of the one or more microphones 30 is at least two, the at least two microphones 30 are provided at the inner side of one or two temples 11 of the glasses body 10, and are located closer to the front frame 12 relative to a tail end of the temple 11. That is, the microphones 30 are arranged at a position close to the base of the temple 11. The base of the temple 11 is a position where the temple 11 is connected to the front frame 12, which is closer to the user's mouth, so that the user's voice can be better picked up. Preferably, the number of the one or more microphones 30 is two, and the two microphones 30 are arranged vertically on the temples 11 as shown in FIG. 1, or may be arranged laterally or obliquely. The number of the microphones 30 is not limited, the microphones 30 may be grouped or individually arranged on the two temples 11, and they are all within the protection scope of the present application.

The one or more speakers 40 are provided at the inner side of the two temple 11 of the glasses body 10, and are located far away from the front frame 12 relative to the tail end of the temples 11. That is, the one or more speakers 40 are disposed at a position closer to the tail end of the temples 11 than the microphones 30, which is closer to the user's ear, so that the user can hear the output audio more clearly. Preferably, the number of the one or more speakers 40 is at least two. As shown in FIG. 1, taking the number of the one or more speakers 40 as two as an example, two speakers are respectively disposed on the two temples 11. The number of the one or more speakers 40 may also be one, one speaker is disposed on the tail end of one of the temples 11. The number of the one or more speakers 40 also be more, a plurality of speakers are arranged in a preset shape on each temple 11, such as arranged up and down (i.e., arranged vertically), arranged left and right (i.e., arranged laterally), arranged obliquely, or arranged circular etc. The number and arrangement of the one or more speakers 40 are not limited, and they are all within the protection scope of the present application.

Figure 2:
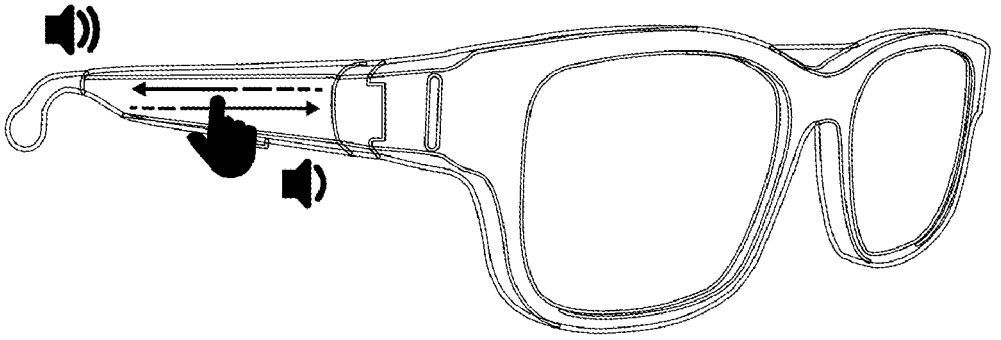
FIG. 2 is a schematic diagram of a user controlling an output volume of a speaker on the smart glasses through gestures according to one embodiment of the present disclosure.

Furthermore, in another embodiment, a touch control module 50 is further provided on the glasses body 10, and specifically includes a touch sensor. The user can use the touch gestures to control the touch control module 50 to slide left and right, so as to increase or decrease the output volume. Referring to FIG. 2, a schematic diagram of the user using the touch gestures to achieve output volume up or down. In FIG. 2, the user uses a gesture of sliding to the left to increase the output volume, and uses a gesture of sliding to the right to decrease the output volume. In FIG. 2, the volume indicated by the volume marker on the left is louder than the volume indicated by the volume marker on the right. The touch control module 50 may also be embodied as a press key, such as a long press key. The user can increase the volume by pressing one side of the long press key used to increase the volume, and can decrease the volume by pressing the other side of the long press key used to decrease the volume. As another example, the touch control module 50 are two short press key, one short press key is for volume up, and the other short press key is for volume down. The user can adjust the volume by pressing the two short press keys.

Furthermore, in another embodiment, an automatic volume control switch is further provided on the glasses body 10, and the user can switch between an automatic volume control function and a manual volume control function by turning the switch on or off. When the switch is turned on, the automatic volume control function is turned on, and the smart glasses can automatically control the output volume of the speaker(s) through the method for automatic volume control in the embodiments of the present disclosure. When the switch is turned off, the automatic volume control function is turned off, the manual volume control function is turned on, and the user can manually control the output volume of the speaker(s) by using the touch gestures to control the touch control module. The intelligence of the smart glasses and the convenience of manipulating are further improved.

Furthermore, the smart glasses are connected to the mobile terminal such as mobile phone through a wireless network, an automatic volume control switch is set on a UI (user interface) of the mobile terminal, the smart glasses obtain an automatic volume control switch instruction sent by the mobile terminal, and enable or disable the touch control module according to the automatic volume control switch instruction. The user sends the automatic volume control switch instruction by manipulating the automatic volume control switch set on the UI of the mobile terminal.

In the embodiments of the present disclosure, the smart glasses further include the touch control module and the automatic volume control switch disposed on the glasses body, so that the user can control the output volume of the speaker(s) of the smart glasses through the gestures, and can use the automatic volume control switch to achieve adjusting and controlling of the output volume of the speaker(s) based on two different modes of automatic and manual modes, thereby further improving the intelligence of the smart glasses and the convenience of manipulating.

Furthermore, a battery 60, a proximity sensor 70 and a nine-axis sensor 80 are further provided on the glasses body 10, and the nine-axis sensor 80 may include a three-dimensional acceleration sensor, a three-dimensional gyroscope, a three-dimensional magnetic sensor. The battery 60 may be a rechargeable battery or a button battery, and is used to supply power to various components on the smart glasses. The proximity sensor 70 is used to detect whether the user wears the smart glasses on the face, and whether the smart glasses are worn correctly. The nine-axis sensor 80 is used to detect motion states of the user.

Figure 3:
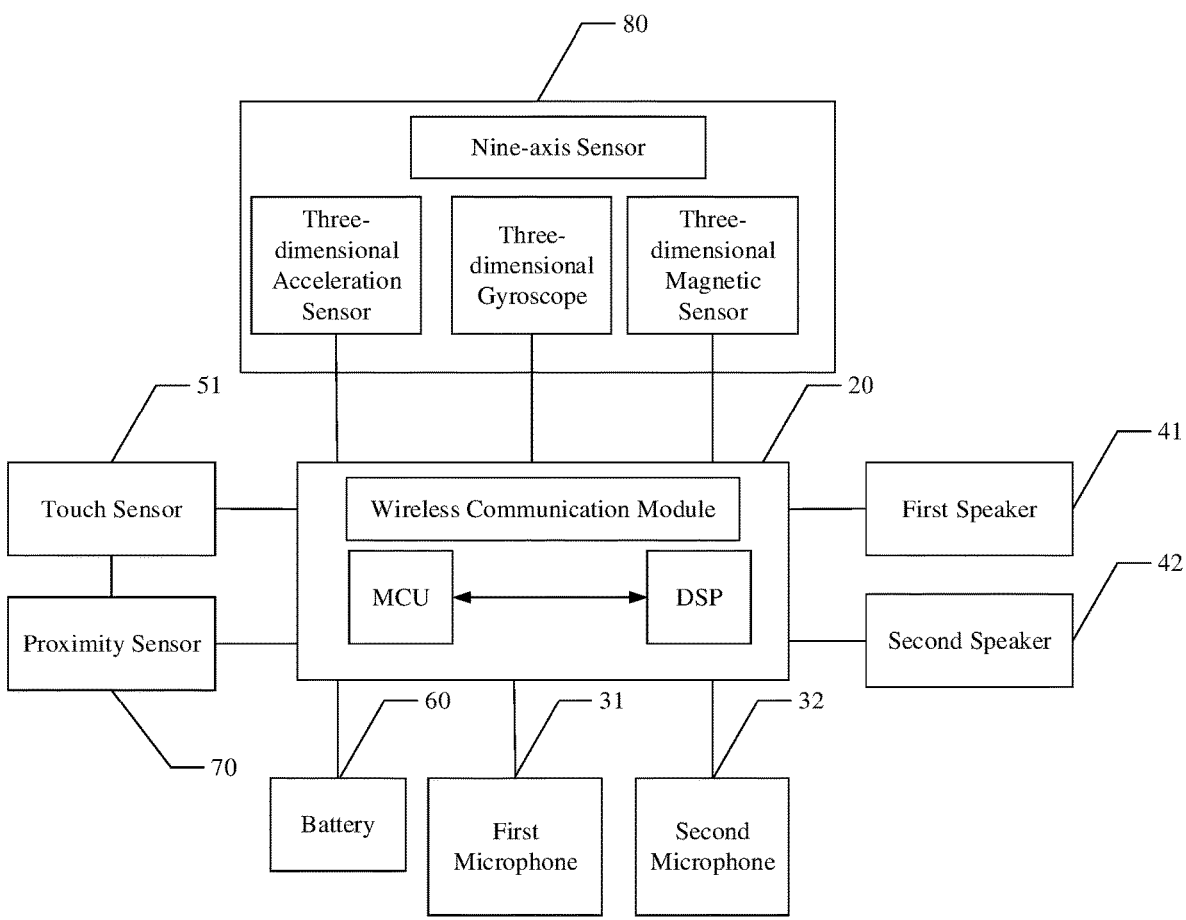
FIG. 3 is a schematic diagram of an internal structure of the smart glasses according to one embodiment of the present disclosure.

Referring to FIG. 3, a schematic diagram of an internal structure of the smart glasses according to one embodiment of the present disclosure. Taking the smart glasses is provided with two microphones and two speakers as an example. The smart glasses mainly include a wireless communication module 20, and a first microphone 31, a second microphone 32, a first speaker 41, a second speaker 42, a touch sensor 51, a proximity sensor 70, a nine-axis sensor 80 and a battery 60 connected to the wireless communication module 20.

The wireless communication module 20 includes MCU and DSP interconnected, and the nine-axis sensor 80 includes a three-dimensional acceleration sensor, a three-dimensional gyroscope, a three-dimensional magnetic sensor.

Figure 4:
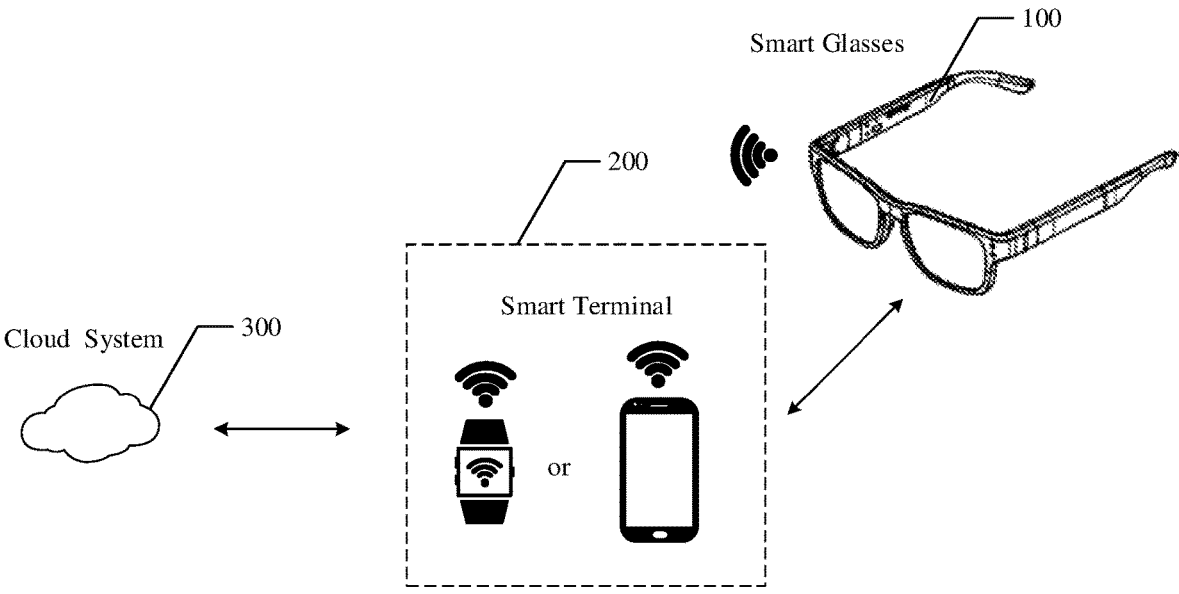
FIG. 4 is a schematic diagram of a structure of the smart glasses system according to one embodiment of the present disclosure.

Referring to FIG. 4, the embodiments of the present disclosure further provide a smart glasses system, and the system includes smart glasses 100, a smart terminal 200, and a cloud system 300.

The smart glasses 100 are connected to the smart terminal 200 via WiFi or Bluetooth, and the smart terminal 200 is connected to the cloud system 300 via WiFi or Bluetooth. The smart terminal 200 is provided with an operation interface for man-machine interactive. Through the operation interface, the user can send various instructions to control and interact with the smart glasses 100, such as selecting and playing songs when listening to music, and adjusting and controlling the output volume through the smart glasses. The cloud system 300 is used to perform storage of large-capacity information or data, big data analysis and transmission, etc., and can obtain data including GPS (Global Positioning System) from the smart terminal 200 to implement the above-mentioned functions.

The smart terminal 200 includes mobile smart terminals such as smart phones and smart watches, and further includes non-mobile smart terminals such as PC machines. The cloud system 300 is specifically a cloud artificial intelligence system, which may include a plurality of servers.

Specifically, the smart glasses 100 are used for: obtaining, through one or more microphones provided on a glasses body of the smart glasses 100, an audio signal; determining whether the audio signal is a noise signal; and in response to the audio signal being the noise signal, calculating a noise level of the noise signal, and adjusting an output volume of one or more speakers provided on the glasses body of the smart glasses 100 to an output volume corresponding to a current noise level of the noise signal according to a preset corresponding relationship between noise levels and output volumes of the one or more speakers.

The smart glasses 100 are further used for sending the adjusted output volume to the smart terminal 200.

The smart terminal 200 is used for synchronously updating an output volume of a speaker of the smart terminal 200 to the adjusted output volume.

In the embodiments of the present disclosure, the smart glasses are connected to the smart terminal through a wireless network, the smart terminal is connected to the cloud system through a wireless network, and the three can process data collaboratively through data transmission, so as to improve the efficiency of data processing. The smart glasses pick up the audio signal through the microphone(s), determine whether the audio signal is the noise signal, and when the audio signal is the noise signal, calculate the noise level of the noise signal, and adjust the output volume of the speaker(s) to the output volume corresponding to the noise level of the noise signal according to the preset corresponding relationship between noise levels and output volumes of the one or more speakers(s), thereby realizing automatic adjusting and controlling the output volume of the speaker(s) according to the noise volume, and improving the intelligence of the smart glasses. Moreover, the smart glasses further send the adjusted output volume to the smart terminal, and the smart terminal synchronously updates the output volume of a speaker of the smart terminal to the adjusted output volume, so as to realize the synchronization of the output volume of the speaker(s) of the smart glasses on the speaker of the smart terminal, realize the unity of smart glasses system data, and further improve the intelligence of the smart glasses system.

The embodiments of the present disclosure further provide a method for automatic volume control based on the smart glasses in the above-mentioned embodiments, which is described in detail below.

Referring to FIG. 5, a flow diagram of a method for automatic volume control according to one embodiment of the present disclosure. The method for automatic volume control is applied to the smart glasses in the above-mentioned each embodiment. The execution body of the method may be the processor of the smart glasses, specifically executed by the MCU and/or DSP in the processor, and the method includes:

S501, obtaining the audio signal picked up by the one or more microphones provided on the glasses body of the smart glasses;

S502, determining whether the audio signal is the noise signal;

When the audio signal is not the noise signal, the smart glasses do not adjust the output volume of the one or more speaker.

S503, in response to the audio signal being the noise signal, calculating a noise level of the noise signal;

The noise level of the noise signal is calculated according to a preset noise volume algorithm.

S504, automatically adjusting the output volume of the one or more speakers of the smart glasses according to the noise level of the noise signal.

The output volume of the one or more speakers provided on the glasses body of the smart glasses is adjusted to an output volume corresponding to the current noise level of the noise signal, according to a preset corresponding relationship between noise levels and output volumes of the one or more speakers.

Specifically, in the corresponding relationship between noise levels and output volumes of the one or more speakers, the higher the noise level, the higher the corresponding output volume, and the lower the noise value, the lower the corresponding output volume, that is, the noise value is positively correlated with the output volume.

Specifically, the audio signal is divided into a plurality of single frames. The current frame is a frame currently received by the processor. For example, if the audio signal is divided into n frames and the processor currently receives the k-th frame, then the k-th frame is the current frame. When a noise level of a current frame is lower than a noise level of a previous frame of the current frame, the output volume of the one or more speakers is decreased according to the preset corresponding relationship. When the noise level of the current frame is higher than the noise level of the previous frame of the current frame, the output volume of the one or more speakers is increased according to the preset corresponding relationship. When the noise level of the current frame is equal to the noise level of the previous frame of the current frame, the output volume of the one or more speakers is not adjusted.

For unspecified details of this embodiment, please refer to the relevant descriptions in each of the above-mentioned embodiments.

In the embodiments of the present disclosure, by obtaining the audio signal through the microphone(s) provided on the glasses body of the smart glasses, determining whether the audio signal is the noise signal, and when the audio signal is the noise signal, calculating the noise level of the noise signal, and adjusting the output volume of the speaker(s) to the output volume corresponding to the noise level of the noise signal according to the preset corresponding relationship between noise levels and output volumes of the one or more speakers(s), automatic adjusting and controlling the output volume of the speaker(s) according to the noise volume is realized, and the convenience of user action is improved. Furthermore, by the method, the audio volume heard by the user under different noise volumes can auditory consistent, and the auditory experience is improved.

Referring to FIG. 6, a flow diagram of the method for automatic volume control according to another embodiment of the present disclosure. The method for automatic volume control is applied to the smart glasses in each of the above-mentioned embodiments. The execution body of the method may be the processor of the smart glasses, and the method includes:

S601, setting up a corresponding relationship between noise levels and output volumes of one or more speakers of the smart glasses;

The corresponding relationship between noise levels and output volumes of the one or more speakers customized by a user through the mobile terminal is obtained. The numerical values of the noise levels are positively correlated with the output volumes of the one or more speakers. The corresponding relationship is stored on the MCU of the processor of the smart glasses, or the corresponding relationship is stored on a storage medium of the smart glasses for the MCU to call.

S602, obtaining an audio signal picked up by one or more microphones provided on a glasses body of the smart glasses;

S603, determining whether the audio signal is a noise signal;

Specifically, the audio signal is divided into single frames, and the processor determines whether the audio signal is the noise signal using a preset voice detection algorithm based on the single frames.

Figure 7:
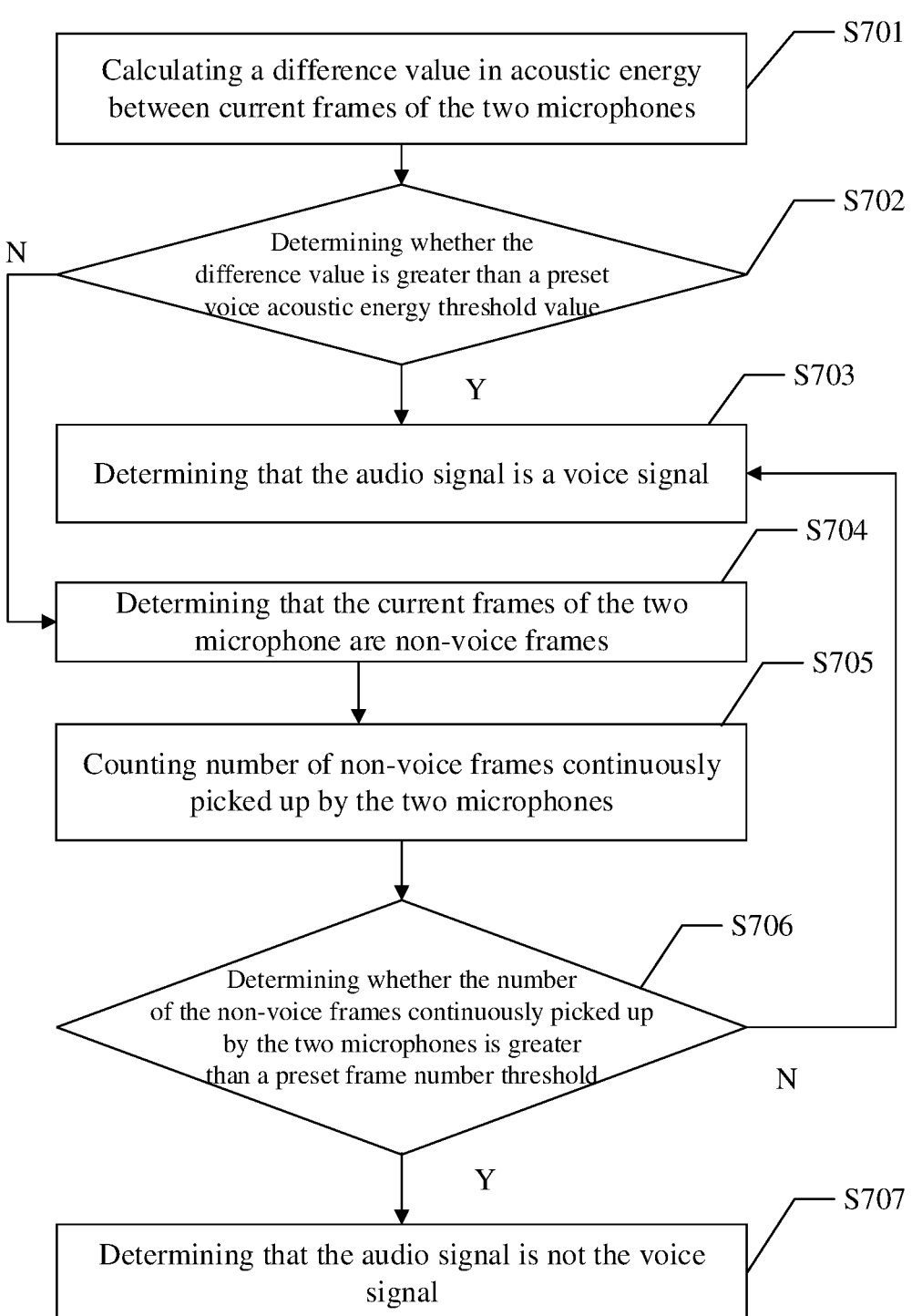
FIG. 7 is a flow diagram of a voice detection algorithm in the method for automatic volume control according to one embodiment of the present disclosure.

When the smart glasses have two microphones, the specific steps of determining whether the audio signal is the noise signal using the preset voice detection algorithm based on the single frames are shown in FIG. 7:

S701, calculating a difference value in acoustic energy between current frames of the two microphones;

The first acoustic energy of the current frame of the first microphone 31 and the second acoustic energy of the current frame of the second microphone 32 are calculated, and the difference value between the first acoustic energy and the second acoustic energy is calculated. The specific calculation formula of the acoustic energy is as follows:

The audio signals picked up by the first microphone and the second microphone are x1(n), x2(n), respectively, and the long-term energies En1 and En2 of the audio signals are calculated according to the following formula:

$$En1(n)=En1(n-1)*(1-\alpha)+\alpha*|x1(n)|, \text{ where, } |x| \text{ is an absolute value, } \alpha=0.0025;$$

$$En2(n)=En2(n-1)*(1-\alpha)+\alpha*|x2(n)|, \text{ where, } |x| \text{ is an absolute value, } \alpha=0.0025;$$

The calculation formulas of acoustic energy E1 of the k-th frame of the first microphone and acoustic energy E2 of the k-th frame of the second microphone are as follows:

$$E1 = \ln\left(\frac{\sum_{n=1}^{N} En1(n)}{N}\right);$$

$$E2 = \ln\left(\frac{\sum_{n=1}^{N} En2(n)}{N}\right);$$

Where, N is the number of voice signal samples in a frame, specifically is 128; and ln( ) is a natural logarithm.

S702, determining whether the difference value is greater than a preset voice acoustic energy threshold value;

The preset voice acoustic energy threshold is a value for determining whether an audio is a voice, and can be customized according to the requirement of the smart glasses adjusting the output volume.

When the difference value is greater than the preset voice acoustic energy threshold value, the step S703 is performed; and when the difference value is not greater than the preset voice acoustic energy threshold value, the step S704 is performed.

S703, determining that the audio signal is a voice signal;

S704, determining that the current frames of the two microphones are not voice frames (that is, are non-voice frames);

S705, counting number of non-voice frames continuously picked up by the two microphones;

S706, determining whether the number of the non-voice frames continuously picked up by the two microphones is greater than a preset frame number threshold;

When the number of the non-voice frames continuously picked up by the two microphones is greater than the preset frame number threshold, the step S707 is performed; and when the number of the non-voice frames continuously picked up by the two microphones is less than a preset frame number threshold, the step S703 is performed.

S707, determining that the audio signal is not the voice signal.

The audio signal is determined as not the voice signal, but the noise signal.

When the audio signal is the voice signal, the output volume of the one or more speakers is not adjusted.

S604, in response to the audio signal being the noise signal, calculating a noise level of the noise signal;

The noise level of the noise signal is calculated according to a preset noise volume algorithm.

S605, automatically adjusting an output volume of the one or more speakers of the smart glasses according to the noise level of the noise signal;

The output volume of the one or more speakers provided on the glasses body of the smart glasses is adjusted to an output volume corresponding to the current noise level of the noise signal according to a preset corresponding relationship between noise levels and output volumes of the one or more speakers.

Specifically, in the corresponding relationship between noise levels and output volumes of the one or more speakers, the higher the noise level, the higher the corresponding output volume, and the lower the noise value, the lower the corresponding output volume, that is, the noise value is positively correlated with the output volume.

When a noise volume of the current frame is lower than a noise volume of a previous frame of the current frame, the output volume of the one or more speakers is decreased according to the corresponding relationship. When the noise volume of the current frame is higher than the noise volume of the previous frame, the output volume of the one or more speakers is increased according to the corresponding relationship. When the noise volume of the current frame is equal to the noise volume of the previous frame, the output volume of the one or more speakers is not adjusted.

S606, synchronizing the adjusted output volume to the smart terminal.

The adjusted output volume is sent to the smart terminal through a wireless network, so that the smart terminal synchronously updates an output volume of the speaker of the smart terminal to the adjusted output volume.

For unspecified details of this embodiment, please refer to the relevant descriptions in each of the above-mentioned embodiments.

In the embodiments of the present disclosure, the user can customize the correspondence between the noise level of the noise signal picked up by the microphone(s) of the smart glasses and the output volume of the speaker(s), thereby improving the flexibility and controllability of adjusting and controlling output volume. Furthermore, by obtaining the audio signal through the microphone(s) provided on the glasses body of the smart glasses, determining whether the audio signal is noise signal, and when the audio signal is the noise signal, calculating the noise level of the noise signal and adjusting the output volume of the speaker(s) to the output volume corresponding to the noise level of the noise signal according to the preset corresponding relationship between noise levels and output volumes of the one or more speakers(s), automatic adjusting the output volume of the speaker according to the noise volume is realized, and the convenience of the user action is improved. Furthermore, by synchronizing the adjusted output volume on the smart terminal connected to the smart glasses, the consistency of output volume of the speaker is realized on the smart terminal, the intelligence of the smart system composed of smart glasses and smart terminal is further improved, and the convenience of user action is further improved.

Figure 8:
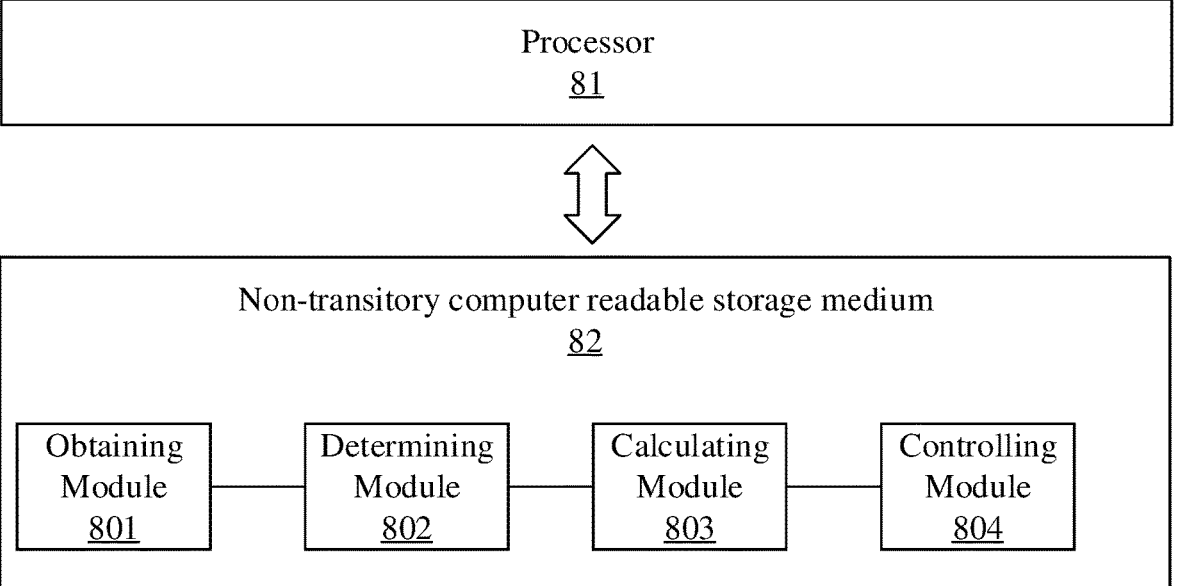
FIG. 8 is a schematic diagram of a structure of a device for automatic volume control according to one embodiment of the present disclosure.

Referring to FIG. 8, a schematic diagram of a structure of a device for automatic volume control according to one embodiment of the present disclosure. The device for automatic volume control may be the processor of the smart glasses including a MCU and a DSP, or may be the MCU. For ease of description, only parts related to the embodiment of the present disclosure are shown in the FIG. 1. The device for automatic volume control includes: a processor 81 and a non-transitory computer readable storage medium 82 coupled to the processor 81. One or more computer programs stored on the non-transitory computer readable storage medium 82 and executable on the processor 81. The one or more computer programs comprise instructions including:

an obtaining module 801 used for obtaining an audio signal picked up by one or more microphones provided on a glasses body of smart glasses;

a determining module 802 used for determining whether the audio signal is a noise signal;

a calculating module 803 used for, in response to the audio signal being the noise signal, calculating a noise level of the noise signal; and a controlling module 804 used for adjusting an output volume of one or more speakers provided on the glasses body of the smart glasses to an output volume corresponding to a current noise level of the noise signal according to a preset corresponding relationship between noise levels and output volumes of the one or more speakers.

Furthermore, the determining module 802 is further used for: dividing the audio signal into single frames; and determining whether the audio signal is the noise signal using a preset voice detection algorithm based on the single frames.

Furthermore, when the number of the one or more microphones is two, the determining module 802 is further used for: calculating a difference value in acoustic energy between current frames of the two microphones, and determining whether the difference value is greater than a preset voice acoustic energy threshold value; in response to the difference value not being greater than the preset voice acoustic energy threshold value, determining that the current frames of the two microphones are non-voice frames; counting number of non-voice frames continuously picked up by the two microphones; and in response to the number of the non-voice frames continuously picked up by the two microphones being greater than a preset frame number threshold, determining that the audio signal is not a voice signal.

Furthermore, the controlling module 804 is further used for: in response to a noise level of a current frame of the noise signal being lower than a noise level of a previous frame of the current frame, correspondingly decreasing the output volume of the one or more speakers according to the preset corresponding relationship; in response to the noise level of the current frame of the noise signal being higher than the noise level of the previous frame of the current frame, correspondingly increasing the output volume of the one or more speakers according to the preset corresponding relationship; and in response to the noise level of the current frame of the noise signal being equal to the noise level of the previous frame of the current frame, no adjust the output volume of the one or more speakers.

Furthermore, the device for automatic volume control further includes a sending module used for sending the adjusted output volume to the smart terminal through a wireless network, so that the smart terminal synchronously updates an output volume of a speaker of the smart terminal to the adjusted output volume.

Furthermore, the obtaining module 801 is further used for obtaining and storing a corresponding relationship between noise levels and output volumes of the one or more speakers customized by a user through a mobile terminal, wherein numerical values of the noise levels are positively correlated with the output volumes of the one or more speakers.

For unspecified details of this embodiment, please refer to the relevant descriptions in each of the above-mentioned embodiments.

In the embodiments of the present disclosure, the user can customize the correspondence between the noise level of the noise signal picked up by the microphone(s) of the smart glasses and the output volume of the speaker(s), thereby improving the flexibility and controllability of adjusting and controlling output volume. Furthermore, by obtaining the audio signal through the microphone(s) provided on the glasses body of the smart glasses, determining whether the audio signal is the noise signal, and when the audio signal is the noise signal, calculating the noise level of the noise signal, and adjusting the output volume of the speaker(s) to the output volume corresponding to the noise level of the noise signal according to the preset corresponding relationship between noise levels and output volumes of the one or more speakers(s), so as to realize automatic adjusting the output volume of the speaker according to the noise volume, and improve the convenience of the user action. Furthermore, by synchronizing the adjusted output volume on the smart terminal connected to the smart glasses, the consistency of output volume of the speaker is realized on the smart terminal, the intelligence of the smart system composed of smart glasses and smart terminal is further improved, and the convenience of user action is further improved.

The present disclosure further provides a non-transitory computer-readable storage medium, which can be set in the smart glasses in the above-mentioned embodiments, and may be the memory of the smart glasses. The computer-readable storage medium stores one or more computer programs. When the one or more programs are executed by the processor, all or part of the method for automatic volume control in the above-mentioned embodiment(s) shown in FIG. 5 and FIG. 6 is performed. Further, the computer-readable storage medium may also be a USB flash drive, a mobile hard disk, a read-only memory (ROM), a Random Access Memory (RAM), a disk, or a CD-ROM, or any medium capable of storing program code.

It should be noted that for the various method embodiments described above, for the sake of simplicity, they are described as a series of action combinations. However, those skilled in the art should understand that the present disclosure is not limited by the order of the described actions, as certain steps can be performed in a different order or simultaneously. Additionally, it should be understood that the embodiments described in this invention are preferred embodiments, and the actions and modules involved are not necessarily required for the present disclosure.

In the above-mentioned embodiments, the descriptions of each embodiment have different focuses. For portions not described in a particular embodiment, reference can be made to relevant descriptions in other embodiments.

The above is a description of the smart glasses, method and device for automatic volume control, and smart glasses system provided by the present disclosure. Those skilled in the art should understand that based on the embodiments of the present disclosure, there may be changes in specific implementation methods and application scope. Therefore, the content of this specification should not be construed as limiting the present disclosure.

What is claimed is:

1. Smart glasses, comprising: a glasses body, a wireless communication module, one or more microphones and one or more speakers;

wherein the wireless communication module, the one or more microphones and the one or more speakers are provided on the glasses body;

a processor is built into the wireless communication module, and the processor is connected to the one or more microphones and the one or more speakers;

the one or more microphones are configured to pick up an audio signal and transmit the audio signal to the processor; and the processor is configured to:

determine whether the audio signal is a noise signal; and in response to the audio signal being the noise signal, calculate a noise level of the noise signal, and adjust an output volume of the one or more speakers to an output volume corresponding to the noise level of the noise signal according to a preset corresponding relationship between noise levels and output volumes of the one or more speakers;

wherein a touch control module is further provided on the glasses body, and the touch control module is connected to the processor and comprises a touch sensor; and the touch control module is configured to adjust the output volume of the one or more speakers in response to a touch action of a user; and wherein an automatic volume control switch is further provided on the glasses body, the automatic volume control switch is connected to the processor, and the automatic volume control switch is configured to control enabling of the touch control module by turning on or off.

2. The smart glasses of claim 1, wherein number of the one or more microphones is at least two, and wherein the at least two microphones are provided at inner side of at least one temple of the glasses body, and are located closer to a front frame of the glasses body relative to a tail end of the at least one temple.

3. The smart glasses of claim 1, wherein number of the one or more speakers is at least two, and wherein the at least two speakers are provided at inner side of at least one temple of the glasses body, and are located away from a front frame of the glasses body relative to a tail end of the at least one temple.

4. The smart glasses of claim 1, wherein the smart glasses obtain an automatic volume control switch instruction sent by a mobile terminal, the mobile terminal is connected to the smart glasses through a wireless network, and the smart glasses control the enabling of the touch control module by turning on or off according to the automatic volume control switch instruction; and wherein the automatic volume control switch instruction is sent by the user by controlling an automatic volume control switch set on a user interface of the mobile terminal.

5. The smart glasses of claim 1, wherein the processor comprises a microcontroller and a digital signal processor, and the microcontroller is connected to the digital signal processor.

6. A method for automatic volume control, applied to the smart glasses according to claim 1, comprising:

obtaining the audio signal picked up by the one or more microphones provided on the glasses body of the smart glasses;

determining whether the audio signal is the noise signal;

in response to the audio signal being the noise signal, calculating the noise level of the noise signal; and adjusting the output volume of the one or more speakers provided on the glasses body of the smart glasses to the output volume corresponding to the noise level of the noise signal according to the preset corresponding relationship between noise levels and output volumes of the one or more speakers.

7. The method of claim 6, wherein the step of determining whether the audio signal is the noise signal comprises:

dividing the audio signal into single frames; and determining whether the audio signal is the noise signal using a preset voice detection algorithm based on the single frames.

8. The method of claim 7, wherein when the number of the one or more microphones is two, the step of determining whether the audio signal is the noise signal using the preset voice detection algorithm based on the single frames comprises:

calculating a difference value in acoustic energy between current frames of the two microphones, and determining whether the difference value is greater than a preset voice acoustic energy threshold value;

in response to the difference value not being greater than the preset voice acoustic energy threshold value, determining that the current frames of the two microphones are non-voice frames;

counting number of non-voice frames continuously picked up by the two microphones; and in response to the number of the non-voice frames continuously picked up by the two microphones being greater than a preset frame number threshold, determining that the audio signal is the noise signal.

9. The method of claim 8, wherein the step of adjusting the output volume of the one or more speakers provided on the glasses body of the smart glasses to the output volume corresponding to the current noise level of the noise signal according to the preset corresponding relationship between noise levels and output volumes of the one or more speaker comprises:

in response to a noise level of a current frame of the noise signal being lower than a noise level of a previous frame of the current frame, correspondingly decreasing the output volume of the one or more speakers according to the preset corresponding relationship;

in response to the noise level of the current frame of the noise signal being higher than the noise level of the previous frame, correspondingly increasing the output volume of the one or more speakers according to the preset corresponding relationship; and in response to the noise level of the current frame of the noise signal being equal to the noise level of the previous frame, no adjust the output volume of the one or more speakers.

10. The method of claim 6, wherein after adjusting the output volume of the one or more speakers provided on the glasses body of the smart glasses to the output volume corresponding to the current noise level of the noise signal, the method further comprises:

sending the adjusted output volume to the smart terminal through a wireless network, so that the smart terminal synchronously updates an output volume of a speaker of the smart terminal to the adjusted output volume.

11. The method of claim 6, wherein before obtaining the audio signal picked up by the one or more microphones provided on the glasses body of the smart glasses, the method further comprises:

obtaining and storing a corresponding relationship between noise levels and output volumes of the one or more speakers customized by a user through a mobile terminal, wherein numerical values of the noise levels are positively correlated with the output volumes of the one or more speakers.

12. A device for automatic volume control, comprising:

a processor;

a non-transitory computer readable storage medium coupled to the processor; and one or more computer programs stored on the non-transitory computer readable storage medium and executable on the processor;

wherein, the one or more computer programs comprise:

instructions for obtaining an audio signal picked up by one or more microphones provided on a glasses body of smart glasses;

instructions for determining whether the audio signal is a noise signal;

instructions for, in response to the audio signal being the noise signal, calculating a noise level of the noise signal; and instructions for adjusting an output volume of one or more speakers provided on the glasses body of the smart glasses to an output volume corresponding to the noise level of the noise signal according to a preset corresponding relationship between noise levels and output volumes of the one or more speakers;

wherein determining whether the audio signal is the noise signal comprises:

dividing the audio signal into single frames; and determining whether the audio signal is the noise signal using a preset voice detection algorithm based on the single frames; and when the number of the one or more microphones is two, determining whether the audio signal is the noise signal using the preset voice detection algorithm based on the single frames comprises:

calculating a difference value in acoustic energy between current frames of the two microphones, and determining whether the difference value is greater than a preset voice acoustic energy threshold value;

in response to the difference value not being greater than the preset voice acoustic energy threshold value, determining that the current frames of the two microphones are non-voice frames;

counting number of non-voice frames continuously picked up by the two microphones; and in response to the number of the non-voice frames continuously picked up by the two microphones being greater than a preset frame number threshold, determining that the audio signal is the noise signal.

13. A smart glasses system, comprising:

smart glasses, a smart terminal and a cloud system;

wherein the smart glasses are connected to the smart terminal through a wireless network, and the smart terminal is connected to the cloud system through a wireless network;

the smart glasses are configured for:

obtaining, through one or more microphones provided on a glasses body of the smart glasses, an audio signal;

determining whether the audio signal is a noise signal; and in response to the audio signal being the noise signal, calculating a noise level of the noise signal, and adjusting an output volume of one or more speakers provided on the glasses body of the smart glasses to an output volume corresponding to the noise level of the noise signal according to a preset corresponding relationship between noise levels and output volumes of the one or more speakers;

the smart glasses are further configured for sending the adjusted output volume to the smart terminal; and the smart terminal is configured for synchronously updating an output volume of a speaker of the smart terminal to the adjusted output volume;

wherein a touch control module is further provided on the glasses body of the smart glasses, and the touch control module is connected to a processor of the smart glasses and comprises a touch sensor; and the touch control module is configured to adjust the output volume of the one or more speakers in response to a touch action of a user; and wherein an automatic volume control switch is further provided on the glasses body of the smart glasses, the automatic volume control switch is connected to the processor, and the automatic volume control switch is configured to control enabling of the touch control module by turning on or off.

14. The smart glasses system of claim 13, wherein determining whether the audio signal is the noise signal comprises:

dividing the audio signal into single frames; and determining whether the audio signal is the noise signal using a preset voice detection algorithm based on the single frames.

15. The smart glasses system of claim 14, wherein when the number of the one or more microphones is two, determining whether the audio signal is the noise signal using the preset voice detection algorithm based on the single frames comprises:

calculating a difference value in acoustic energy between current frames of the two microphones, and determining whether the difference value is greater than a preset voice acoustic energy threshold value;

in response to the difference value not being greater than the preset voice acoustic energy threshold value, determining that the current frames of the two microphones are non-voice frames;

counting number of non-voice frames continuously picked up by the two microphones; and in response to the number of the non-voice frames continuously picked up by the two microphones being greater than a preset frame number threshold, determining that the audio signal is the noise signal.

* * * * *